United States Patent [19]
Hughes

[11] 3,839,679
[45] Oct. 1, 1974

[54] HIGH SPEED GATED VIDEO INTEGRATOR WITH ZERO OFFSET

[75] Inventor: Richard Smith Hughes, Ridgecrest, Calif.

[73] Assignee: The United States of America as represented by the Secretary of the Navy, Washington, D.C.

[22] Filed: June 21, 1973

[21] Appl. No.: 372,442

[52] U.S. Cl. .................. 328/127, 307/228, 307/242, 307/246, 328/151

[51] Int. Cl. .......................... H03k 4/12, G06g 7/18

[58] Field of Search ........... 307/228, 240, 241, 242, 307/246, 255, 261; 328/127, 128, 132, 151, 181, 182, 183, 184, 185

[56] References Cited

UNITED STATES PATENTS

| | | | |
|---|---|---|---|
| 3,150,272 | 9/1964 | Gard | 307/228 |
| 3,458,724 | 7/1969 | Nakamura | 307/242 |
| 3,514,632 | 5/1970 | Henderson et al. | 307/228 |
| 3,621,281 | 11/1971 | Hagen | 328/181 X |
| 3,719,834 | 3/1973 | Dao | 307/228 X |

OTHER PUBLICATIONS

Sharma, "A Linear Ramp Voltage Generator Using Transistors," I.E.E.–I.E.R.E. Proceedings–India; Vol. 8, No. 2, (April–June/1970), p. 60–64.

Curtis, "Mark-Read Vertical Correction," IBM Tech. Discl. Bull.; Vol. 13, No. 2, p. 326–327; July 1970.

*Primary Examiner*—Rudolph V. Rolinec
*Assistant Examiner*—L. N. Anagnos
*Attorney, Agent, or Firm*—R. S. Sciascia; Roy Miller; R. W. Adams

[57] ABSTRACT

A high speed gated video integrator having double differential amplifiers wherein equal currents bias "on" one side of each differential amplifier. Then, to perform integration, the differential amplifiers are gated, and integration occurs only during such gated period. Low level pulses, independent of polarity and amplitude, can be integrated.

4 Claims, 2 Drawing Figures

HIGH SPEED GATED VIDEO INTEGRATOR WITH ZERO OFFSET

BACKGROUND OF THE INVENTION

In the field of video signal processors, i.e., high frequency signal processors, there are many approaches and circuits for accomplishing video signal integration. All such prior known integrators are deficient in that they either are unable to provide a stable DC output, have low speed capabilities only and are unable to provide a satisfactory high speed response, or have inherent measurable offset which effects the accuracy of the response. The present invention overcomes all of these problems by employing a novel approach.

SUMMARY OF THE INVENTION

The present invention is a circuit which, in the embodiment described, is used as an integrator responsive to an enable command and having double differential amplifiers wherein equal currents bias one side of each differential amplifier "on." Disabling gate signals from a controllable gate signal source are applied to the differential amplifiers to switch the previously conductive side "off" and the nonconductive side "on." Thereby, a charging or discharging current responsive to an unknown input pulse occuring during the gate period is coupled to the charge storage capacitor. The circuit integrates the pulses independently of polarity and amplitude by coupling negative pulses through one differential amplifier and positive pulses through the other. In addition to the components shown in FIG. 1, the alternative embodiment shown in FIG. 2, has a continuous current source coupled to each differential amplifier to provide a circuit that will process even pulses too low in amplitude to be otherwise handled. It is highly responsive and has the capability of operating on low level signals. The circuit may be used as, for example, a ramp generator instead of as an integrator.

DESCRIPTION OF THE PREFERRED EMBODIMENT

Figure 1:
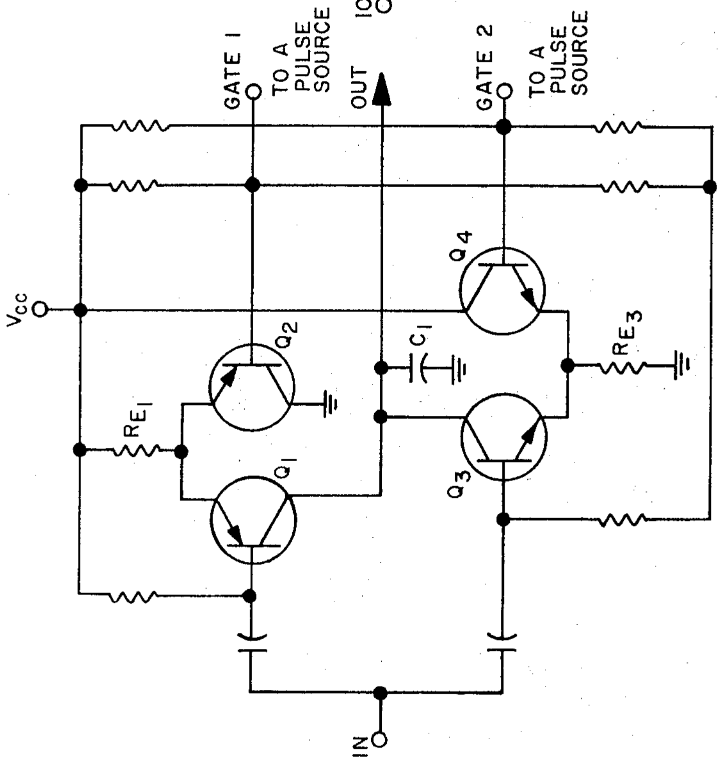
FIG. 1 is a schematic diagram of the present invention showing the basic differential amplifier and the gate inputs.

FIG. 1 shows the basic differential amplifier, and also shows the technique of utilizing it as an integrator by the addition of at least one gating signal. The input which can be a high frequency, video pulse is coupled through input capacitors to base terminals of transistors $Q_1$ and $Q_3$. When the gating signals are not applied to transistors $Q_2$ and $Q_4$ they are "on" as a result of the bias voltage applied. As a result, transistors $Q_1$ and $Q_3$ are forced "off" because transistors $Q_1$ and $Q_3$ are restricted by transistors $Q_2$ and $Q_4$, respectively, the input cannot turn them "on." The circuit output is the charge on capacitor $C_1$, which charge will not be changed by the input as long as transistors $Q_1$ and $Q_3$ remain disabled.

If appropriate gate signals are applied to the base terminals of transistors $Q_2$ and $Q_4$ they will be switched "off." That is, if a positive pulse is applied to the base of transistor $Q_2$ and a negative pulse to the base of transistor $Q_4$, they will be switched "off." In response thereto transistor $Q_1$ and $Q_3$ are permitted to process the input. As a result, the charge on capacitor $C_1$, coupled between ground and the common junction of transistors $Q_1$ and $Q_3$, will respond to the input and will either be charged or discharged, increased or decreased, depending on the input polarity.

A charge current, or increase, to the charge on capacitor $C_1$ results from the following; assuming the gating signals are applied, if the input is negative, transistor $Q_1$ is turned "on." The current in the collector of transistor $Q_1$ will be given by, $$i_{C_1} = e_{(in-)} - V_{BE_1}/R_{E_1} \quad (1)$$

and the charge on the capacitor will be $$e_{charge} = e_{(in-)} - V_{BE_1}/R_{E_1}\ C_1\tau \quad (2)$$

where $\tau$ = time $Q_1$ is turned "on."

A discharge current, or decrease, in the charge on capacitor $C_1$ results from the following: Assuming the gate signals are applied, a positive input turns transistor $Q_3$ "on." The current in the collector of transistor $Q_3$ may be given by, $$i_{C_3} = e_{(in+)} - V_{BE_3}/R_{E_3} \quad (3)$$

and the capacitor voltage discharges to $$e\ \text{discharge} = e_{(in+)} - V_{BE_3}/R_{E_3}\ C_1\tau \quad (4)$$

where $\tau$ = time $Q_3$ is turned "on."

The maximum inputs that may be handled by this circuit are limited by the $V_{BE}$ breakdown voltages of the transistors. If large inputs must be handled, diodes with a high breakdown voltage may be placed in series with the emitters.

The disadvantage of the circuit of FIG. 1 is that the input must exceed the $V_{BE}$ turn on voltage of $Q_1$ or $Q_3$ to operate properly. This disadvantage, and the limitations of the $V_{BE}$ breakdown voltage of the transistors is overcome by the alternative circuit illustrated in FIG. 2.

Figure 2:
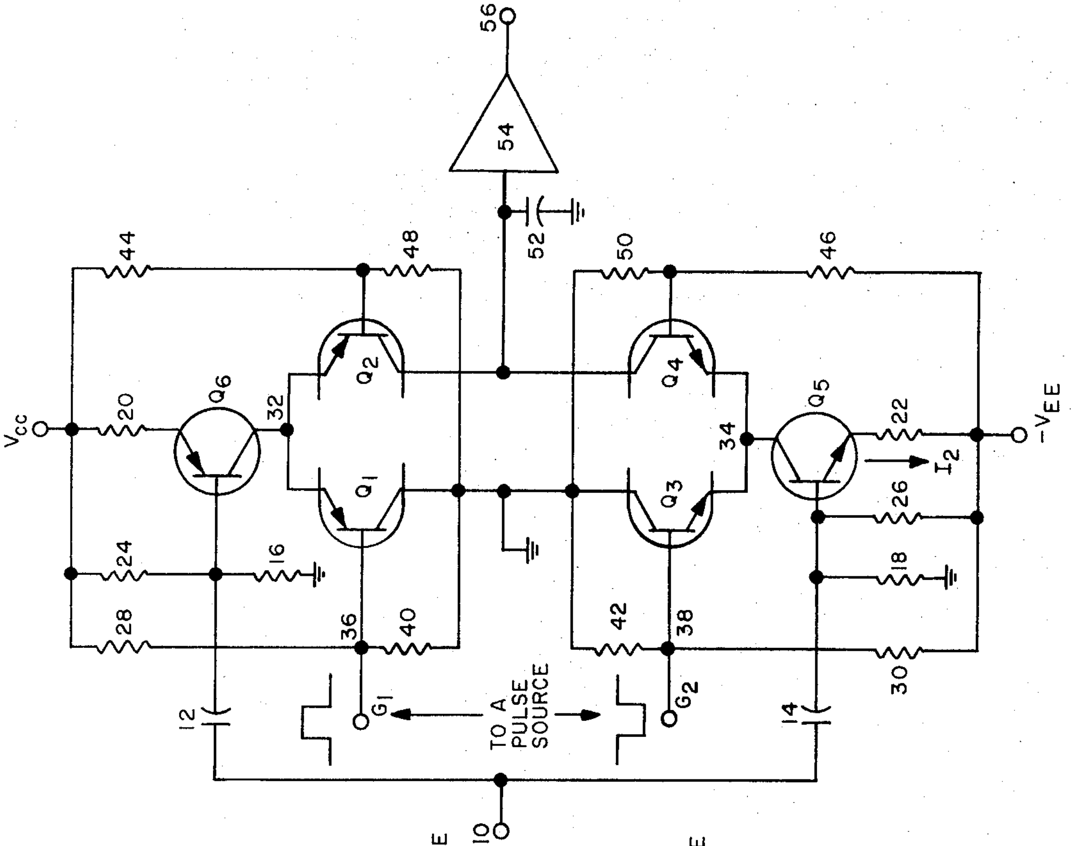
FIG. 2 is a schematic diagram of an operative embodiment of the present invention.

FIG. 2 shows an alternative embodiment of the present invention that overcomes the disadvantages listed above by including continuous current sources $Q_5$ and $Q_6$, and their respective circuitry, in the embodiment described above. Input 10 is coupled to transistors $Q_5$ and $Q_6$, and gate signals $G_1$ and $G_2$ are coupled to transistors $Q_1$ and $Q_3$, respectively, of the double differential amplifier circuit composed of transistors $Q_1$ – $Q_4$ and their associated components. If transistors $Q_1$ and $Q_3$ are not provided with gating signals $G_1$ and $G_2$, respectively, the transistors will be biased "on." And, the bias currents through transistors $Q_5$ and $Q_6$ will be equal. Thus, if no gating signals ($G_1$ and $G_2$) are applied, the bias currents through resistor 20 and transistor $Q_6$, and through resistor 22 and transistor $Q_5$, will be conducted by transistors $Q_1$ and $Q_3$ to ground. As a result, the charge on capacitor 52 will remain unchanged by the input pulse.

If the appropriate gating signals $G_1$ and $G_2$ are applied to transistors $Q_1$ and $Q_2$, the transistors will be turned "off." That is, if a positive gate pulse is applied to the base of transistor $Q_1$, and a negative gate pulse applied to the base of transistor $Q_3$, those transistors will be turned "off" and transistors $Q_2$ and $Q_4$ will be turned "on." But, if no input is applied to input 10, the charge on capacitor 52 will still remain unchanged. That is, because the bias currents through $Q_5$ and $Q_6$, resulting from the DC bias voltage sources $V_{CC}$ and $V_{EE}$, are equal, they will cancel each other's effect on the capacitor and the charge on capacitor 52 will remain unchanged.

With an input pulse and gate signals $G_1$ and $G_2$ applied, and transistors $Q_2$ and $Q_4$ "on," the operation of the circuit can be analyzed as follows: The input pulse at input 10 is coupled through capacitors 12 and 14 to the circuitry of transistors $Q_5$ and $Q_6$, which transistors are already conducting, as described above. The current through either transistor $Q_5$ or $Q_6$, depending on the polarity of the input, is given by $$i_e = e_{in}/R_E$$

wherein: $i_e$ is the emitter current, and $R_E$ is the emitter resistor 20 or 22.

And, the charge, or discharge, current for capacitor 52; which is the difference between the current through $Q_6$ and $Q_2$, and the current through $Q_4$ and $Q_5$; may be given as $$i \text{ charge (or discharge)} = C\ dV_c/dt, \text{ (or discharge)}$$

Thus, $$i \text{ charge (or discharge)} = C\ dV_c/dt = e_{in}/R_E.$$

As a result, regardless of whether or not an input pulse is applied to input 10, a switching spike which would otherwise be caused by the gating signals, will not occur to disturb the charge stored on capacitor 52. And, because transistors $Q_5$ and $Q_6$ are continuously biased "on," thereby eliminating offset voltages, low level signals may be intigrated.

To reiterate, if the gate signals are not applied the input and bias currents are shunted off to ground through transistor $Q_1$ or transistor $Q_3$. If the gate signals are applied the input is coupled through transistors $Q_4$ and $Q_5$, or transistors $Q_2$ and $Q_6$ are constantly conductive, thereby eliminating the necessity for a high level input to turn them on. And, the circuitries of transistors $Q_5$ and $Q_6$ are matched and conductive to prevent charge disturbing transients resulting from the switching of the gate signals.

What is claimed is:

1. An electronic integrator circuit, comprising:

an input for receiving an unknown electrical pulse;

at least one differential amplifier pair wherein each differential amplifier of said pair has first and second transistors with common connected first terminals providing first and second current paths through said differential amplifier;

a separate constant current source attached to each said differential amplifier including at least one transistor having its first terminal coupled to a bias voltage source, its second terminal coupled to said common connected first terminals of its respective differential amplifier and its third terminal coupled to said input wherein the current value provided by the current sources is controlled by the electrical signal received by said input;

means for storing an electrical charge coupled to the second terminal of the second transistor of each differential amplifier;

wherein the second terminal of said first transistor of each said differential amplifier is connected to circuit common ground; and means coupled to the third terminal of the first transistor of each said differential amplifier for selectively controlling the current path within said differential amplifiers by simultaneously rendering each said first transistor non-conductive;

wherein the charge on the storing means is responsive to the current provided by the current sources through said second current paths.

2. The circuit of claim 1 wherein said current path controlling means is responsive to a controllable electrical pulse source, and said first transistor of each differential amplifier is driven non-conductive by an appropriate electrical pulse.

3. The circuit of claim 2 wherein the electrical pulses from said controllable pulse source are simultaneously coupled to the first transistor of each differential amplifier, such that the charge on said storage device is responsive to the pulse at said receiving input during the period said pulses are applied to said first transistors.

4. The circuit of claim 3 wherein said current sources are single transistor circuits wherein the transistor has emitter, collector, and base terminals with the base of the transistor connected to said receiving input and the collector connected to the junction of said common connected first terminals.

* * * * *